United States Patent
Tsirkin et al.

(10) Patent No.: US 12,430,159 B2
(45) Date of Patent: Sep. 30, 2025

(54) ENCRYPTED MEMORY GUEST/HOST COMMUNICATION

(71) Applicant: Red Hat, Inc., Raleigh, NC (US)

(72) Inventors: Michael Tsirkin, Yokneam Illit (IL); Karen Lee Noel, Pembroke, NH (US)

(73) Assignee: Red Hat, Inc., Raleigh, NC (US)

( * ) Notice: Subject to any disclaimer, the term of this patent is extended or adjusted under 35 U.S.C. 154(b) by 622 days.

(21) Appl. No.: 17/660,496

(22) Filed: Apr. 25, 2022

(65) Prior Publication Data
US 2023/0342169 A1   Oct. 26, 2023

(51) Int. Cl.
*G06F 9/455* (2018.01)

(52) U.S. Cl.
CPC ............ *G06F 9/45558* (2013.01); *G06F 2009/45587* (2013.01)

(58) Field of Classification Search
CPC ............... G06F 9/45558; G06F 2009/45587
See application file for complete search history.

(56) References Cited

U.S. PATENT DOCUMENTS

| | | | |
|---|---|---|---|
| 8,977,842 B1* | 3/2015 | McCorkendale | G06F 21/53 380/285 |
| 9,710,400 B2 | 7/2017 | Chaturvedi et al. | |
| 10,102,152 B2* | 10/2018 | Axnix | G06F 9/45558 |
| 10,303,899 B2 | 5/2019 | Durham et al. | |
| 10,592,434 B2 | 3/2020 | Sliwa et al. | |
| 10,599,489 B2 | 3/2020 | Bacher et al. | |
| 10,846,117 B1 | 11/2020 | Steinberg | |
| 10,956,321 B2 | 3/2021 | Ferguson et al. | |
| 2013/0016832 A1* | 1/2013 | Yamashita | G06F 21/606 380/44 |
| 2013/0219387 A1 | 8/2013 | Moeller et al. | |
| 2017/0317991 A1* | 11/2017 | Lionetti | G06F 3/0647 |
| 2018/0137273 A1* | 5/2018 | Bacher | G06F 11/3698 |
| 2020/0042745 A1* | 2/2020 | Wallach | G06F 12/1408 |
| 2020/0065134 A1* | 2/2020 | Iyer | G06F 12/1009 |
| 2024/0045981 A1* | 2/2024 | Santaus | G06F 21/602 |

OTHER PUBLICATIONS

"Fast Networking with Socket-Outsourcing in Hosted Virtual Machine Environments", Eiraku et al., Conference Paper, Proceedings of the 2009 ACM Symposium on Applied Computing (SAC), Honolulu, Hawaii, USA; Jan. 2009.
"Shared-Memory Optimizations for Inter Virtual Machine Communication", Ren et al., National University of Defense Technology; Georgia Institute of Technology, 2016.

* cited by examiner

*Primary Examiner* — Jorge A Chu Joy-Davila
(74) *Attorney, Agent, or Firm* — Womble Bond Dickinson (US) LLP (57) ABSTRACT

Systems and methods for enabling a Virtual Machine (VM) and hypervisor to communicate are disclosed. An example method includes sending data from a hypervisor to a virtual machine (VM) by storing, by the hypervisor, the data to an encrypted memory page of the VM, wherein the data stored by the hypervisor to the encrypted memory page is not encrypted. The method also includes processing, by the VM, the data stored to the encrypted memory page according to a decryption routine to generate scrambled data. The method also includes looking up, by the VM, the scrambled data in a translation table to obtain unscrambled data, wherein the unscrambled data is the data as it was originally stored to the encrypted memory page by the hypervisor.

15 Claims, 7 Drawing Sheets

ENCRYPTED MEMORY GUEST/HOST COMMUNICATION

TECHNICAL FIELD

Aspects of the present disclosure relate to virtual machines (VMs), and more particularly, to facilitating communication between a guest VM and a host hypervisor that use encryption.

BACKGROUND

Hypervisors abstract the physical resources of a computing device such as physical processing devices (e.g., processors, CPUs, etc.) and physical memory (e.g., RAM) into virtual resources which can be utilized to deploy multiple VMs. The hypervisor may manage and assign these virtual resources to each VM running on the computing device. Hypervisors also facilitate communication between virtual devices (such as entropy sources) and VMs, and provide access to the guest memory of VMs. Secure encrypted virtualization (SEV) is a technology that is designed to isolate VMs from the hypervisor and other code that may coexist on the physical host at the hardware level. In this way, SEV may protect VMs from physical threats as well as protect them from other VMs and even the hypervisor itself. SEV is useful in a variety of applications. For example, certain customers of a cloud service may want to secure their BM-based workloads from the cloud administrator to keep their data confidential and minimize their exposure to bugs in the cloud provider's infrastructure.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Providing virtual devices implemented in a hypervisor access to guest memory of a VM poses an inherent security issue. For example, confidential data of the guest VM may be vulnerable to snooping by unauthorized users or software (e.g., using hardware probing). Secure encrypted virtualization (SEV) addresses this by allowing VMs to encrypt data that is stored to memory.

Systems that use SEV also generally use some mechanism that enables communication between the guest OS and the hypervisor. One such mechanism is to allow the guest OS to designate certain pages of guest memory as encrypted (private) and other pages of guest memory as unencrypted (shared). Guest memory pages designated as private are encrypted using an encryption key assigned to the VM and are for the exclusive use of the VM for storing confidential data, while guest memory pages designated as shared may be used for communication between the VM and the hypervisor. This technique is efficient but involves core modifications to the guest OS.

A mechanism that can be implemented without changes to the guest OS involves VM driver changes. For example, a driver can be configured to store and retrieve data in a specific memory area that can be located by firmware. Memory accesses to this memory area cause a trap to the firmware, which maps some memory as unencrypted. This technique can be implemented without core changes to the guest OS. However, the trap to firmware causes the VM to perform a full context switch, which greatly increases the processing overhead for communications between the VM and the hypervisor, possibly resulting in thousands of microseconds of latency, for example. When the driver is going through a firmware context switch for each access, latency becomes much higher. This may be especially true for a large legacy VM with multiple drivers loaded and implementing SEV. Such high latency may be unacceptable for some workloads, which may require latency of tens of microseconds.

Various types of communications may be low bandwidth but also rely on low latency. For example, a stock trading platform will generally benefit from low latency but does not generally involve high bandwidth throughput. The present disclosure describes techniques that enable low latency communication between a hypervisor and a virtual machine using memory encryption. In embodiments, communication between the hypervisor and the guest may be achieved through encrypted memory without going through firmware. To achieve this, the hypervisor and a driver on the guest OS perform a setup process that facilitates further communication.

During the setup process the hypervisor and a driver on the guest OS exchange patterns of known data to learn a translation between the two domains. The hypervisor writes unencrypted data into encrypted memory that is accessible to the driver. The pattern of the data written by the hypervisor is known by both the hypervisor and the driver. The driver then accesses the data and processes it using a decryption routine as it would do with any other data stored to encrypted memory. The decryption routine scrambles the data, but since there is a 1-to-1 correspondence between the encrypted data and the unencrypted data, the results obtained from running the decryption routine over this data will be the same each time. Thus, the driver can associate the scrambled data with the known data pattern that the scrambled data represents and store this information to a translation table. The above operation may be repeated for multiple hypervisor pattern values. For example, all possible values of an 8-bit counter can be learned by performing the above operation 64 times and storing each result to the translation table. After the setup process is complete, the driver will have a translation table that correlates the scrambled data with the plaintext data.

A similar setup process can be performed in the opposite direction. The driver writes encrypted data into encrypted memory that is accessible to the hypervisor. The pattern of the data written by the driver is known by both the hypervisor and the driver. The hypervisor then accesses the data and associates the encrypted data pattern with the actual data that the encrypted data pattern represents and stores this information to a translation table. This operation may be repeated for multiple driver pattern values, after which the hypervisor will have a translation table that correlates the encrypted data with the plaintext data.

After the setup process, both the hypervisor and the driver executing on the VM will have translation tables that can be used to translate the received data (which will be encrypted or scrambled) into the plaintext data. Each time the driver receives data from the hypervisor, the driver runs the decryption routine over the data and retrieves the plaintext data from the driver's version of the translation table. Each time the hypervisor receives encrypted data from the driver, the plaintext data can be retrieved from the hypervisor's version of the translation table.

The present techniques provide low latency communication between a hypervisor and a VM that uses secure encrypted virtualization. Low latency is achieved because the hypervisor stores the relevant data directly into VM memory and the driver pulls the data from the VM memory. Additionally, because firmware is not involved, there is no context switch, which would otherwise be triggered by the firmware trap. Eliminating the need for context switches reduces the latency of the communications between the VM and the hypervisor.

Additionally, the present techniques may be implemented without making any changes to the guest OS, which would otherwise be needed to designate some memory as encrypted and some memory as unencrypted. In the present techniques, the guest OS can designate all of its memory as encrypted, and the hypervisor and the driver executing on the VM are still able to communicate by using a lookup function performed against a translation table. This allows the hypervisor to translate the encrypted data received from the VM without an encryption key, and allows the VM to translate the scrambled data that results after the data received from the hypervisor is improperly decrypted.

Embodiments of the present techniques also ensure that the hypervisor is not able to circumvent the encryption applied by the VM for other data that is not intended to be consumed by the hypervisor. For example, the encryption may be performed in chunks of several bytes of data (e.g., 64 byte chunks). During the setup process when the translation tables are being built, the known data values that are to be stored to the translation table may occupy only a small number of bytes, for example, one or two bytes of each chunk. Accordingly, the hypervisor can determine the value of a limited number of bits in each chunk, while the remainder of the chunk remains unknown by the hypervisor.

Accordingly, the hypervisor cannot use the setup process to learn a complete mapping of encrypted to unencrypted data.

Figure 1A:
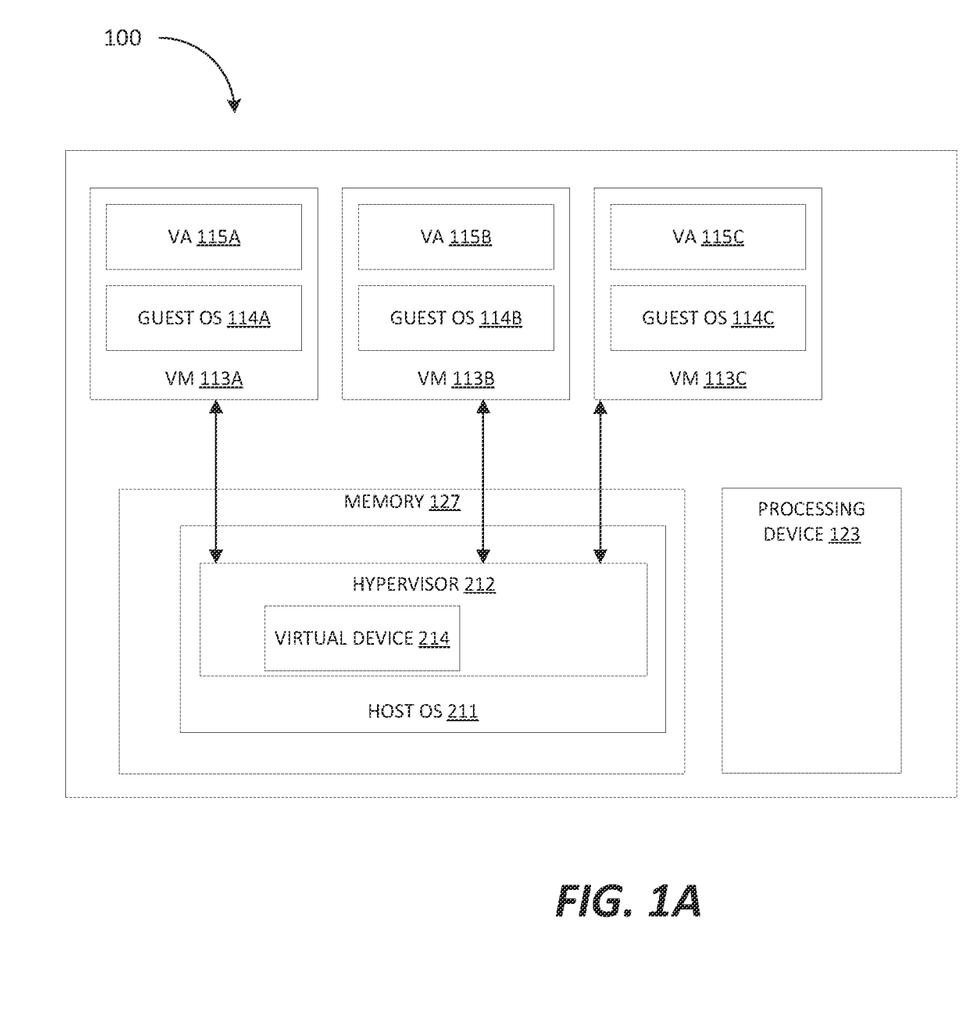
FIG. 1A is a block diagram that illustrates an example computing device, in accordance with some embodiments of the present disclosure.

FIG. 1A is a block diagram that illustrates an example computing device 100. Computing device 100 may include hardware such as processing device 123 (e.g., processors, central processing units (CPUs)), memory 127 (e.g., random access memory (RAM), storage devices (e.g., hard-disk drive (HDD), solid-state drive (SSD), etc.), and other hardware devices (e.g., sound card, video card, etc.). In some embodiments, memory 127 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 127 may be configured for long-term storage of data and may retain data between power on/off cycles of the computing device 100. The computing device 100 may comprise any suitable type of computing device or machine that has a programmable processor including, for example, server computers, desktop computers, laptop computers, tablet computers, smartphones, set-top boxes, etc. In some examples, the computing device 100 may comprise a single machine or may include multiple interconnected machines (e.g., multiple servers configured in a cluster). Memory 127 may include host operating system (OS) 211, which may manage the execution of other components (e.g., software, applications, etc.) and/or may manage access to the hardware (e.g., processors, memory, storage devices etc.) of the computing device 100.

The host OS 211 may include a hypervisor 212, which may also be known as a virtual machine monitor (VMM). In the example shown, hypervisor 212 may be a component of the host OS 211. In another example, hypervisor 212 may run on top of host OS 211, or may run directly on host hardware without the use of a host OS 211. Hypervisor 212 may manage system resources, including access to processing device 123, memory 127, other storage devices (e.g., HDDs, SSDs), and/or other devices (e.g., sound cards, video cards, etc.). The hypervisor 212, though typically implemented in software, may emulate and export a bare machine interface to higher level software in the form of virtual processors and guest memory (virtual resources). Higher level software may comprise a standard or real-time operating system (OS), may be a highly stripped down operating environment with limited operating system functionality, and/or may not include traditional OS facilities, etc. For example, higher level software may be a network virtualization platform (not shown) such as the RedHat™ OpenStack™ virtualization platform. Hypervisor 212 may present other software (i.e., "guest" software) the abstraction of one or more virtual machines (VMs) that provide the same or different abstractions to various guest software (e.g., guest operating system, guest applications).

In some embodiments, a network virtualization platform (also referred to as a "virtualization management service") may also execute on the host OS 211. The network virtualization platform may use a consistent set of application programming interfaces (APIs) to abstract those virtual resources provided by the hypervisor 212 one step further into discrete pools that may be used to configure and deploy VMs (e.g., VMs 113) and virtual applications (e.g., VAs 115) that administrators and users may interact with directly. The network virtualization platform may include a deployment controller to handle creation of VMs 113 as well as provisioning of the VMs 113 with virtual applications 115. The deployment controller may also function to manage the operations of the virtual applications. For example, the network virtualization platform may utilize the deployment controller to create virtual switches (and a VM 113 for the switch to run on) as well as manage the operations of the virtual switch (e.g., configuring/modifying rules and groups, managing connections with other virtual network functions (VNFs) and handling diagnostic tasks). The VMs 113 may be isolated, in that they are not connected to any other device or component of computing device 100, whether virtual or otherwise.

VMs 113A-113C may execute on computing device 100 as described herein. In one embodiment, a VM 113 may be a software implementation of a machine (e.g., a software implementation of a computing device) that includes its own operating system (i.e. guest OS 114) and executes one or more virtual applications (VA) 115. A VA 115 may be an application program, application, or a driver configured to serve a function such as a virtual network function. The hypervisor 212 may emulate the hardware (and other physical resources) to provide virtual resources which may be used by the VMs 113 to execute guest software/applications/drivers (e.g., VAs 115), as discussed in more detail herein. A VM 113 may be, for example, a hardware emulation, a full virtualization, a para-virtualization, and an operating system-level virtualization VM.

A VM 113 may execute a VA 115 (i.e. guest software) which may use an underlying emulation of the physical resources (e.g., virtual processors and guest memory—virtual resources). Both the VM 113 and the VA 115 may be configured and deployed by a network virtualization platform executing atop the host OS 211, as discussed above. The network virtualization platform, via the computing device 100, may provide administrators and users with the capability to virtualize a variety of functions (e.g., network functions).

Although one VA 115 is illustrated in a respective VM 113, a VM 113 may include multiple VAs 115 in other embodiments. In some embodiments, VAs 115 may be deployed and managed by a deployment controller (not illustrated in the figures) executing as part of a network virtualization platform.

Hypervisor 212 may also function to allow virtual devices such as virtual device 214 to execute thereon. For example, hypervisor 212 may provide for the emulation of virtual device 214. Emulated devices may be purely virtual devices that mimic real hardware, and allow a guest OS 114 to work with them using standard in-box drivers. The hypervisor 212 may facilitate communication between a virtual device 214 and the guest OS 114 of a VM 113 (e.g., the drivers thereof). More specifically, hypervisor 212 may map physical addresses to guest memory virtual addresses and provide direct memory access (DMA) address translation. In one example, the hypervisor 212 may map the physical addresses of a virtual device 214 to the virtual addresses of a VM 113 in a page table of the processing device 123. In another example, the guest memory of the VM 113 may be made available to the virtual device 214 in a page table of an input/output memory management unit (IOMMU) (not shown) by the hypervisor 212.

Although hypervisors have traditionally been trusted components, there are numerous use cases for a more secure model as discussed herein. Secure Encrypted Virtualization (SEV) is a technology that isolates VMs at a hardware level from the hypervisor and other code that may happen to coexist on the physical machine (e.g., computing device 100). SEV assigns individual VMs one or more unique encryption keys 118A and 118B (e.g., an advanced encryption standard (AES) key) that is used to automatically encrypt their sensitive data in pages designated as private (encrypted). Thus, when a component such as a hypervisor attempts to read guest memory of a VM, it is only able to see the encrypted bytes. An attacker without knowledge of the encryption key cannot decipher encrypted VM data that is stored in memory. The encryption keys may be generated from a hardware random number generator and may be stored in dedicated hardware registers within processing device 123 where it cannot be directly read by software.

In some embodiments, each VM 113 may have more than one encryption key. For example, each memory page assigned to the VM 113 may be protected by a different encryption key 118. This may enhance security since an illicit access to one memory page may not result in all of the memory pages being compromised.

VMs still execute their own tasks and communicate with outside entities via I/O however. This may include communication over a network link, with a storage server, or with other components, for example. Communication by the VM with outside entities is facilitated by the hypervisor 212, which exposes virtual devices 214 such as virtual network adapters to the VM. Accordingly, communication between the VM 133A and the outside world passes between the VM 113 and the hypervisor 212.

The VM 113 may designate one or more memory pages as an internal memory page 117B. Internal memory pages are configured to be used by the virtual machine 113 to store data that is not shared with outside devices, e.g. other virtual machines, the hypervisor 212, etc. The VM may designate one or more memory pages as a hypervisor communication page 117A to be used for communication with the hypervisor 212. In some embodiments, all of the guest memory 117 used by the VM 113A are encrypted (e.g. private), including internal memory pages 117B and hypervisor communication pages 177A. The internal memory pages 117B and hypervisor communication pages 177A may be encrypted using the same encryption key or separate encryption keys. For example, the hypervisor communication pages 177A may be encrypted using a first encryption key 118A while the internal memory pages 117B are encrypted using a second encryption key 118B. Other arrangements are also possible.

Figure 1B:
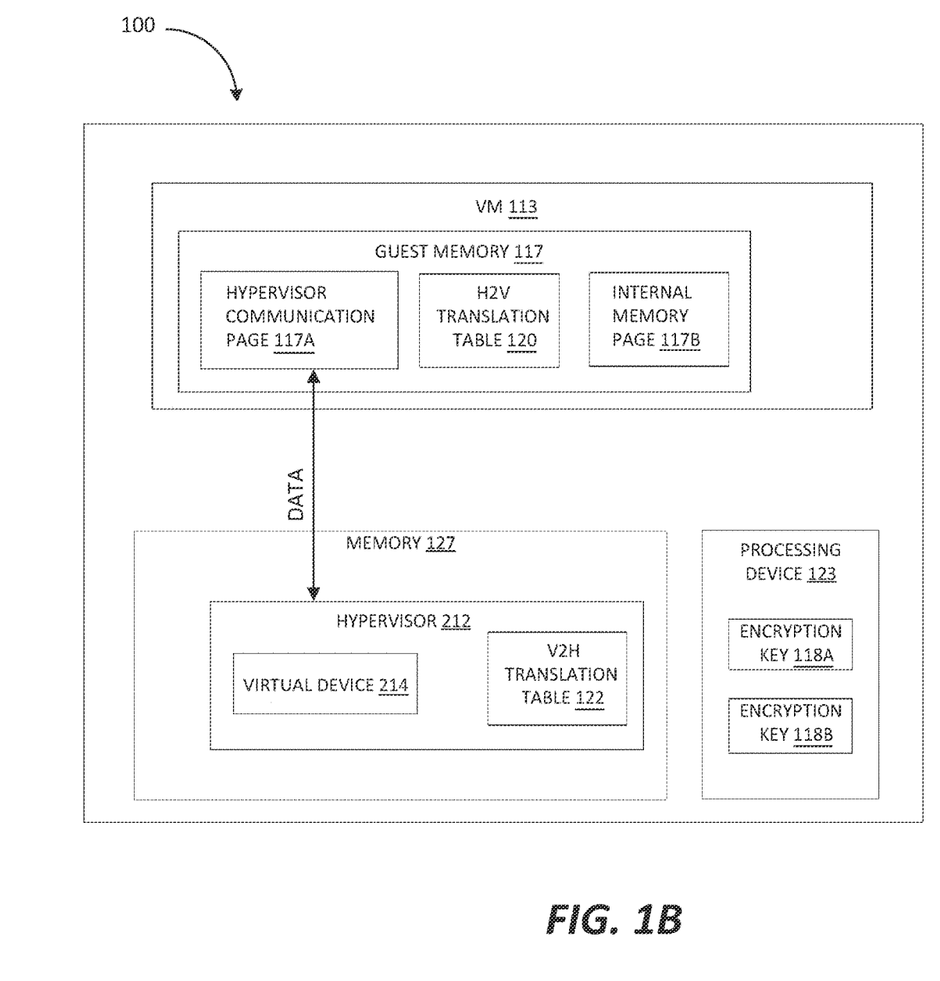
FIG. 1B is a block diagram that illustrates an example computing device, in accordance with some embodiments of the present disclosure.

To enable communication between the VM 113 and the hypervisor 212, both the VM 113 and the hypervisor 212 can include separate translation tables, which are shown in FIG. 1B, as H2V (Hypervisor to VM) translation table 120 and V2H (VM to Hypervisor) translation table 122. The V2H translation table 122 is a lookup table that the hypervisor can use to convert encrypted data received from the VM 113 into an unencrypted form without the use of an encryption key. To send data from the VM 113 to the hypervisor 212, the VM 113 can encrypt the data and store the encrypted data to the hypervisor communication page 117A. The hypervisor can retrieve the memory from the hypervisor communication page 117A and recreate the original data by performing a lookup in the V2H translation table 122 for each data entry received from the VM 113.

To send data from the hypervisor 212 to the VM 113, the hypervisor 212 can write the data to the hypervisor communication page 117A. Even though the VM 113 may designate the hypervisor communication page 117A as encrypted, the hypervisor 212 stores the data unencrypted. Data received at the VM 113 from the hypervisor 212 will be treated as encrypted data and processed according to a decryption routine as if the data was encrypted. This decryption routine scrambles the original data. The H2V translation table 120 is a lookup table that the VM 113 can use to convert the scrambled data back to the original form. For each data entry received from the hypervisor 212 and processed through the decryption routine, the VM 113 can recreate the original data by performing a lookup in the H2V translation table 120.

The translation tables 120 and 122 may be generated during a setup process that enables the VM 113 and the hypervisor 212 to learn a correspondence between received data patterns and the actual original data, i.e., the plaintext data. During the setup process the hypervisor and the guest OS exchange patterns of known data to learn a translation between the two domains. On the VM side, the setup process may be performed by any suitable driver with access to the hypervisor communication page 117A, such as a network driver, and others. The setup process can be performed in two stages, one stage for generating the H2V translation table 120 and one stage for generating the V2H translation table 122. The stages can be performed in any order or in parallel. Example processes for generating the translation tables are shown in FIGS. 2 and 3.

Figure 2:
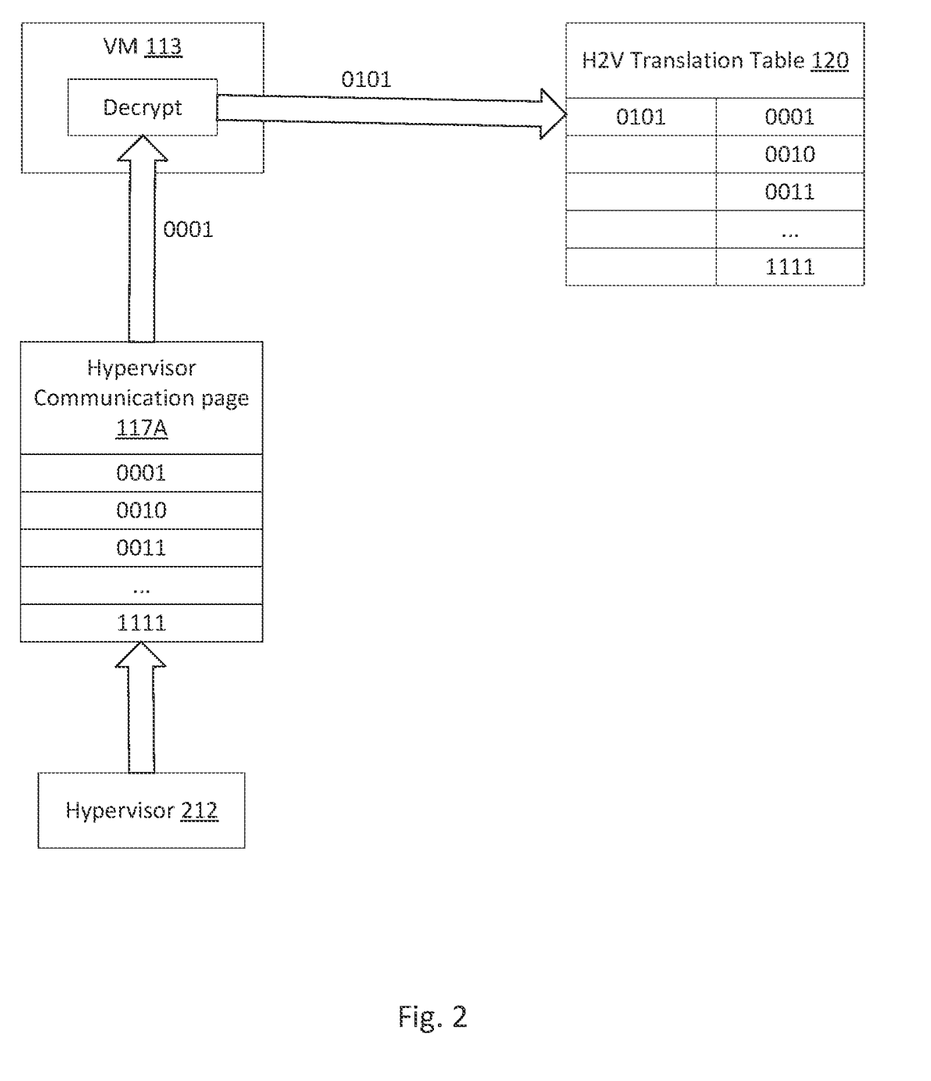
FIG. 2 illustrates an example process for generating a H2V translation table, in accordance with some embodiments of the present disclosure.

FIG. 2 illustrates an example process for generating a H2V translation table 120. During generation of the H2V translation table 120, the hypervisor 212 writes unencrypted data into encrypted memory, e.g., the hypervisor communication page 117A. The pattern of the data (i.e., the actual plaintext values) written by the hypervisor 212 is known by both the hypervisor 212 and the VM 113. For example, the pattern of data may be pre-determined and programmed into the hypervisor 212 (e.g., the virtual device) and the VM 113 (e.g., the driver). In some embodiments, the pattern of data may be stored to a shared memory location that is accessible to both the hypervisor 212 and the VM 113. The shared memory is non-encrypted and may be RAM, CPU registers, persistent storage, and others. The VM 113 then accesses the data and processes it using a decryption routine as it would do with any other data stored to encrypted memory. The decryption routine scrambles the data. For example, in the depicted scenario the value "0001" emerges from the decryption routine as "0101". The scrambled data can be stored to the H2V translation table 120 in a same table entry with the known data. This process may be repeated for each one of the possible bit combinations. Accordingly, any time the VM 113 receives data with the same pattern, the plaintext data can be recovered by performing a look up in the H2V translation table 120 with the scrambled data as input.

Figure 3:
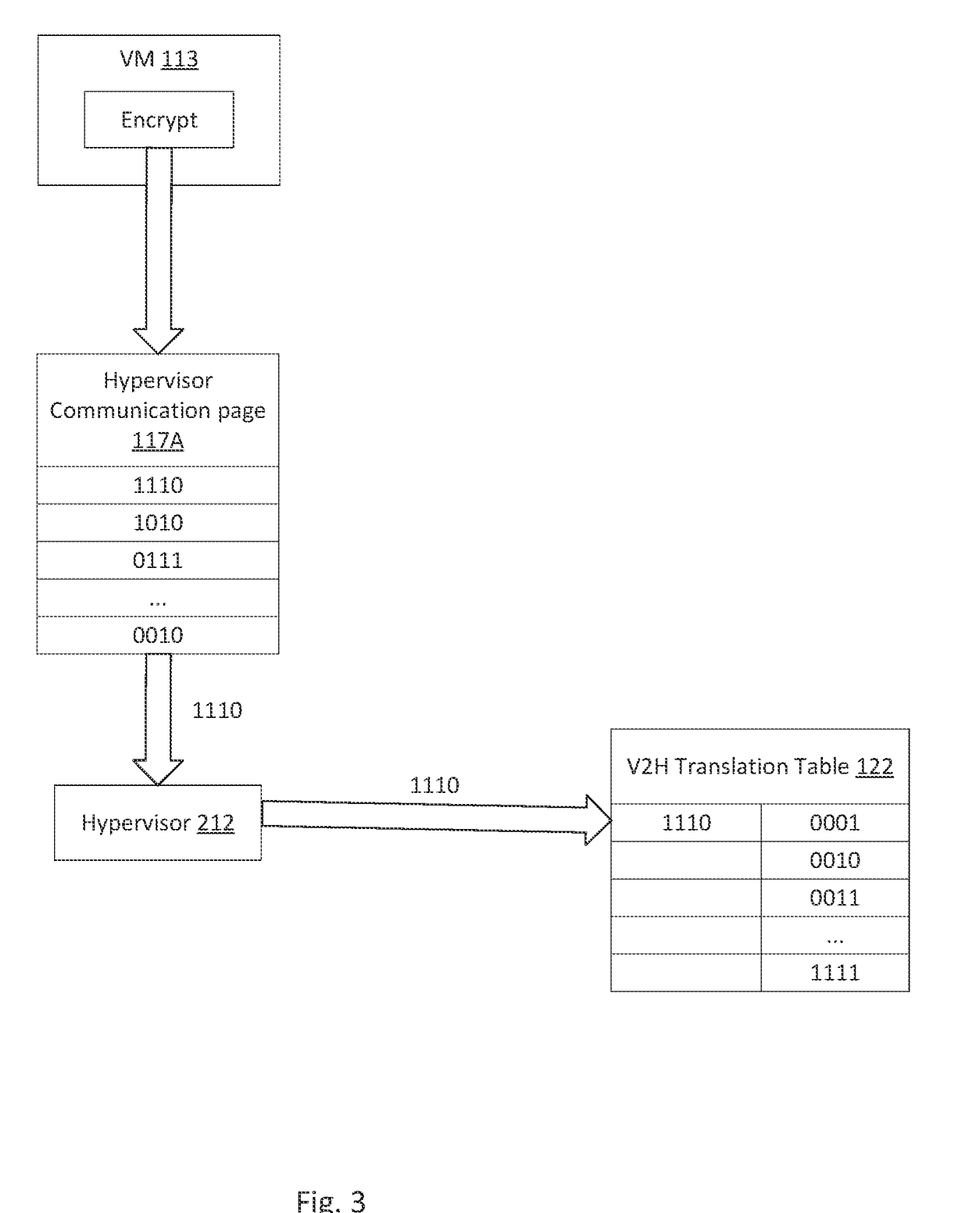
FIG. 3 illustrates an example process for generating a V2H translation table, in accordance with some embodiments of the present disclosure.

FIG. 3 illustrates an example process for generating a V2H translation table 122. During generation of the V2H translation table 122, the VM 113 uses an encryption routine to encrypt a set of data values and write the encrypted data into encrypted memory, e.g., the hypervisor communication page 117A. As before, the pattern of the data (i.e., the actual plaintext values) written by the VM 113 is known by both the hypervisor 212 and the VM 113 (e.g., pre-determined or accessible through shared memory). The hypervisor 212 then accesses each entry of the encrypted data and stores it to the V2H translation table 122 in a same table entry with the known data. For example, in the depicted scenario, the value "1110" is the first value stored to the hypervisor communication page 117A. Accordingly, this value is stored to the first entry of the V2H translation table 122 and associated with the known actual value of "0001". This process may be repeated for each one of the possible bit combinations. Accordingly, any time the hypervisor 212 receives data with the same pattern, the plaintext data can be recovered by performing a look up in the V2H translation table 122 with the encrypted data as input.

The generation of the translation tables 120 and 122 during the setup phase can be performed by firmware residing on the virtual machine. Since the setup phase is performed once, it only triggers a single context switch, which does not have a significant effect on the speed of the setup phase. Once the setup phase is complete, the processing of communications on the VM side may be performed by a driver such that context switches can be avoided.

The examples shown in FIGS. 2 and 3 are simplified for the purpose of clarity. For example, each entry is shown as a four-bit value for a total of 16 unique combinations. However, each table entry can be any suitable number of bits, depending on the encoding scheme used by the VM 113. If an 8-bit encoding scheme is used, each table can have 64 8-bit entries. If a 16-bit encoding scheme is used, each table can have 256 16-bit values. Any suitable encoding scheme can be used, including 32-bit encoding, 64-bit encoding, and others.

Additionally, encryption may be performed on a division of data referred to as a chunk, which may include several bytes of data. For example, a typical encryption scheme may encrypt data in 64 byte chunks. Encrypting the data in this way will cause the data within an encrypted chunk to be a mix of all of the bytes of the original data within the chunk. In some embodiments, each entry of the translation tables 120 and 122 corresponds with an encrypted chunk of data.

For example, if encryption is performed in 64 byte chunks, and the VM 113 uses a 16-bit encoding scheme, each entry to the V2H translation table 122 may be the first two bytes of the encrypted 64-byte chunk received from the VM 113. In this example, the VM 113 may insert the known data into the first two bytes of the chunk (or anywhere within the chunk as long as the placement is consistent) and the remaining bytes can be padding bytes that can be determined arbitrarily. The padded chunk can then be encrypted and stored to the hypervisor communication page 117A to be retrieved by the hypervisor 212. The hypervisor can retrieve the encrypted chunk and store the encrypted chunk to the V2H translation table 122 in association with the known data value. After the setup phase, the VM 113 would use the same pattern of padding bytes to represent the particular data value to ensure that the encrypted chunk represented to the hypervisor 212 is the same as it was during the setup phase. The padding may vary from data value to data value as long as each data value uses the same padding each time it is used. In other words, the padding for value X, can be different from the padding for value Y, but value X will use the same padding each time and value Y will use the same padding each time.

Using the process described above helps to ensure that the hypervisor or a program running on the hypervisor is not able to circumvent the encryption applied by the VM 113. This results from the fact that the hypervisor 212 knows the value of a limited number of bits in each chunk. Thus, following the example described above, while the hypervisor 212 may be able to determine the value of two bytes within a particular 64-byte chunk, the remaining 62 bytes remain hidden. Accordingly, the hypervisor 212 cannot use the setup process to learn a complete mapping of encrypted to unencrypted data. The processing overhead of this communication process may be relatively high since two bytes are recovered for each 64 bytes communicated. However, the increase in processing overhead may be an acceptable tradeoff in return for low latency.

In some cases, there may be times when a higher bandwidth communication may be beneficial depending on the volume of data, such as when multiple packets or larger data packets are to be sent. Accordingly, the VM 113 may be configured to switch to a higher bandwidth communication scheme based on the volume of data. To switch to higher bandwidth communication, a driver of the VM 113 can be configured to store and retrieve unencrypted data in a specific memory area that can be located by firmware. Memory accesses to this memory area cause a trap to the firmware, causing the VM to performing a full context switch. If the VM 113 switches to higher bandwidth communication, batching can be used to minimize the cost of the context switches.

Figure 4:
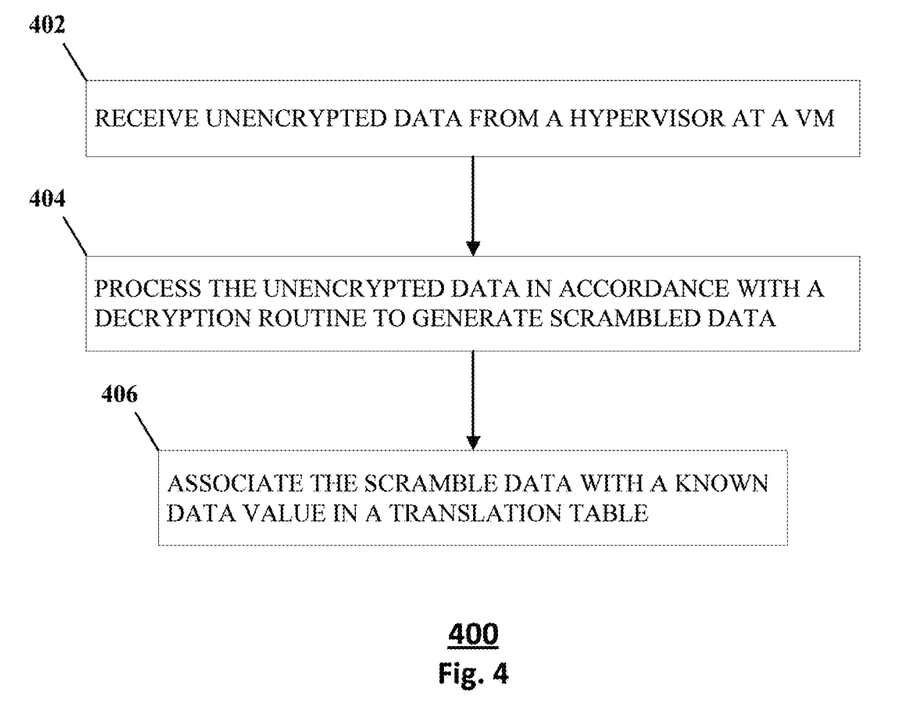
FIG. 4 is a process flow diagram of an example method for generating a translation table to enable communication from a hypervisor to a VM, in accordance with some embodiments of the present disclosure.

FIG. 4 is a process flow diagram of a method 400 for generating a translation table to enable communication from a hypervisor to a VM. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., VM 113 of computing device 100 illustrated in FIGS. 1A and 1B). The method may be performed as a setup routine that is performed after the virtual machine has been instantiated. The method may begin at block 402.

At block 402, unencrypted data, also known as plaintext data, is received from the hypervisor at the virtual machine. To receive data from the hypervisor, the hypervisor (e.g., a virtual device executing on the hypervisor) may store the data to a memory page designated by the virtual machine for hypervisor-to-VM communication (e.g., hypervisor communication page 117), and the VM can then retrieve the data from the memory page. The memory page is also designated as being encrypted memory. The memory page may have an associated encryption key (e.g., encryption key 118) used for decrypting data stored to the memory page.

At block 404, the unencrypted data (i.e., plaintext data) is processed according to a decryption routine to generate scrambled data. In other words, the unencrypted data is processed as though it was encrypted.

At block 406, the scrambled data is associated with a known data value in a translation table (e.g., H2V translation table 120). The actual data values corresponding the scrambled data may be known because they can be separately accessed in a manner that does not hide the actual data values. For example, the known data values may be pre-specified and delivered in a pre-specified order in accordance with the programming of both the hypervisor and the VM. Additionally, the known data values may be written to a shared memory that is accessible to both the hypervisor and the driver. The hypervisor can read that memory to determine what pattern of data values to send and the driver can read that memory to determine the pattern of known data to be stored in the translation table. Blocks 402 to 406 can be repeated for each of the known values until a complete mapping of all of the values is known and stored to the translation table.

Figure 5:
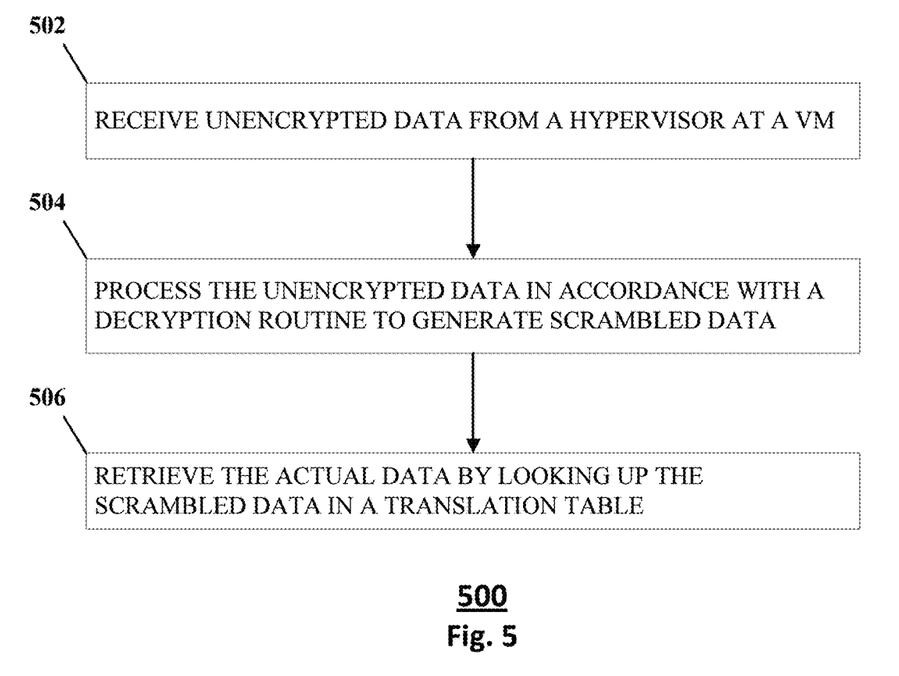
FIG. 5 is a process flow diagram of an example method for using a translation table to enable communication from a hypervisor to a VM, in accordance with some embodiments of the present disclosure.

FIG. 5 is a process flow diagram of a method 500 for using a translation table to enable communication from a hypervisor to a VM. Method 500 may be performed by processing logic that may comprise hardware, software, firmware, or a combination thereof. In some embodiments, the method 500 may be performed by a computing device (e.g., VM 113 of computing device 100 illustrated in FIGS. 1A and 1B). The method may be performed after the setup routine described in relation to FIG. 4 has completed. The method may begin at block 502.

At block 502, unencrypted data is received from the hypervisor (e.g., a virtual device executing on the hypervisor) at the virtual machine, e.g., through the memory page designated by the virtual machine for hypervisor to VM communication (e.g., hypervisor communication page 117). The memory page may have an associated encryption key (e.g., encryption key 118) used for decrypting data stored to the memory page.

At block 504, the unencrypted data is processed according to a decryption routine, which generates scrambled data.

At block 506, the plaintext data is retrieved by looking up the scrambled data in a translation table, e.g., the translation table generated by the process described in relation to FIG. 4. In other words, the scrambled data is used as input to the lookup table and plaintext data is returned as output. The plaintext data is the original unencrypted data that was stored to the memory page by the hypervisor.

Figure 6:
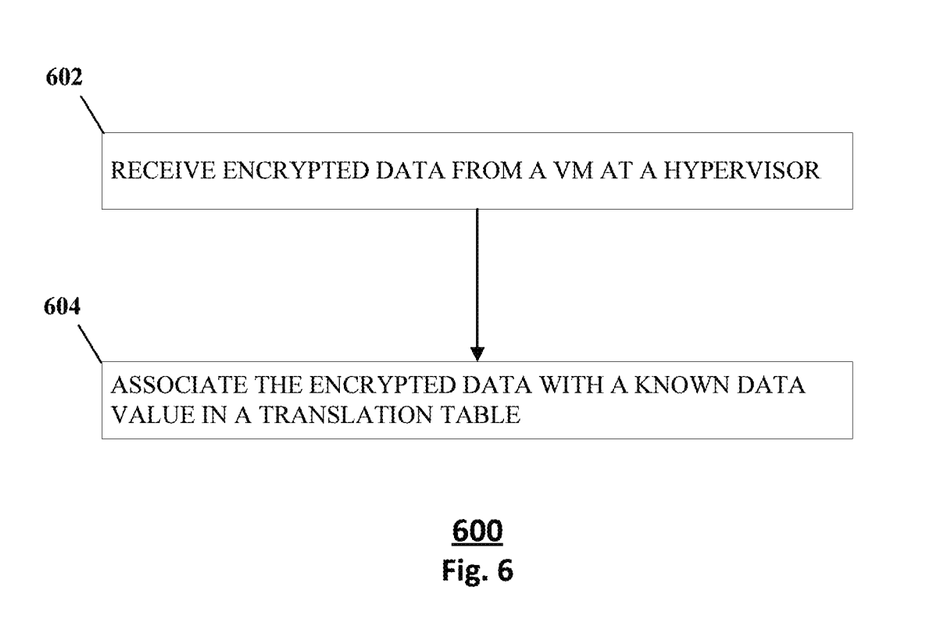
FIG. 6 is a process flow diagram of an example method for generating a translation table to enable communication from a VM to a hypervisor.

FIG. 6 is a process flow diagram of a method 600 for generating a translation table to enable communication from a VM to a hypervisor. Method 600 may be performed by processing logic that may comprise hardware, software, firmware, or a combination thereof. In some embodiments, the method 600 may be performed by a computing device (e.g., hypervisor 212 of computing device 100 illustrated in FIGS. 1A and 1B). The method 600 may be performed as a setup routine that is performed after the virtual machine has been instantiated. The method may begin at block 602.

At block 602, encrypted data is received from the VM at the hypervisor. To receive data from the VM, the VM may store the data to a memory page designated by the VM for hypervisor-to-VM communication (e.g., hypervisor communication page 117), and the hypervisor can then retrieve the data from the memory page. The memory page is also designated by the VM as being encrypted memory. The memory page may have an associated encryption key (e.g., encryption key 118) used for decrypting data stored to the memory page.

At block 604, the encrypted data is associated with a known data value in a translation table (e.g., V2H translation table 122). As explained above, the actual data values corresponding to the encrypted data may be pre-specified and delivered in a pre-specified order in accordance with the programming of both the hypervisor and the VM, or a shared memory may be used to inform the hypervisor and the VM of the pattern of known data. Blocks 604 and 606 can be repeated for each of the known values until a complete mapping of all of the values is known and stored to the translation table.

Figure 7:
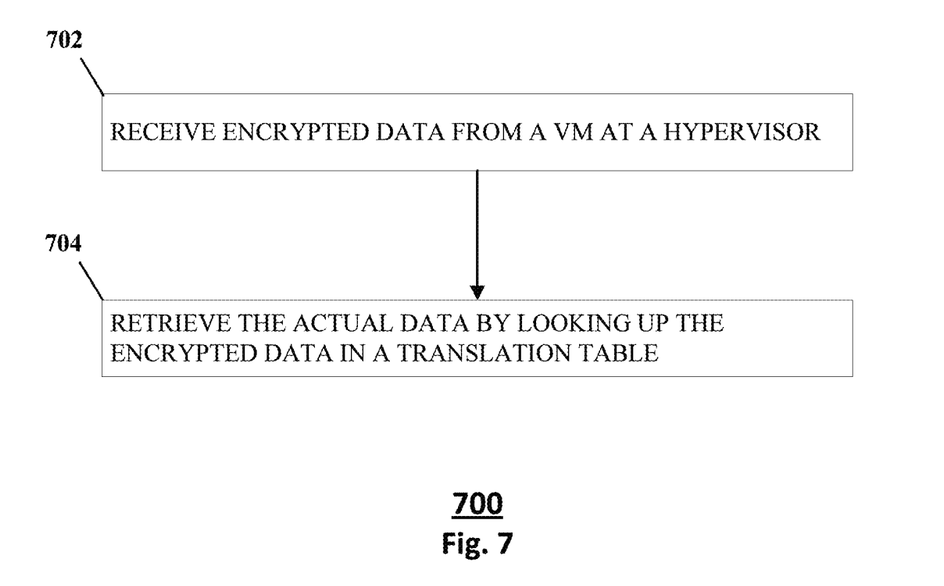
FIG. 7 is a process flow diagram of an example method 700 for using a translation table to enable communication from a VM to a hypervisor.

FIG. 7 is a process flow diagram of a method 700 for using a translation table to enable communication from a VM to a hypervisor. Method 700 may be performed by processing logic that may comprise hardware, software, firmware, or a combination thereof. In some embodiments, the method 700 may be performed by a computing device (e.g., hypervisor 212 of computing device 100 illustrated in FIGS. 1A and 1B). The method 700 may be performed after the setup routine described in relation to FIG. 6 has completed. The method may begin at block 702.

At block 702, encrypted data is received from the VM at the hypervisor, e.g., through the memory page designated by the virtual machine for hypervisor to VM communication (e.g., hypervisor communication page 117). The memory page is also designated by the VM as being encrypted memory having an associated encryption key (e.g., encryption key 118) used for decrypting data stored to the memory page.

At block 704, the plaintext data is retrieved by looking up the encrypted data in a translation table, e.g., the translation table generated by the process described in relation to FIG. 6. In other words, the encrypted data is used as input to the lookup table and plaintext data is returned as output. The plaintext data is the unencrypted version of the data that was stored to the memory page by the VM. The hypervisor is able to obtain the plaintext data without the use of any encryption or decryption key.

The methods 400 and 600 may be performed during a setup phase to configure communication between the VM and the hypervisor, and methods 500 and 700 may be performed for ongoing communications after the setup phase. Not all of the methods have to be performed in a particular embodiment. For example, if the communication between the VM and the hypervisor is one way (VM to hypervisor or hypervisor to VM) then one of the translation tables may not be needed. Additionally, it will be appreciated that the methods 400, 500, 600, and 700 can operate with any suitable encryption chunk size, and any suitable number of bits in the encoding scheme.

Figure 8:
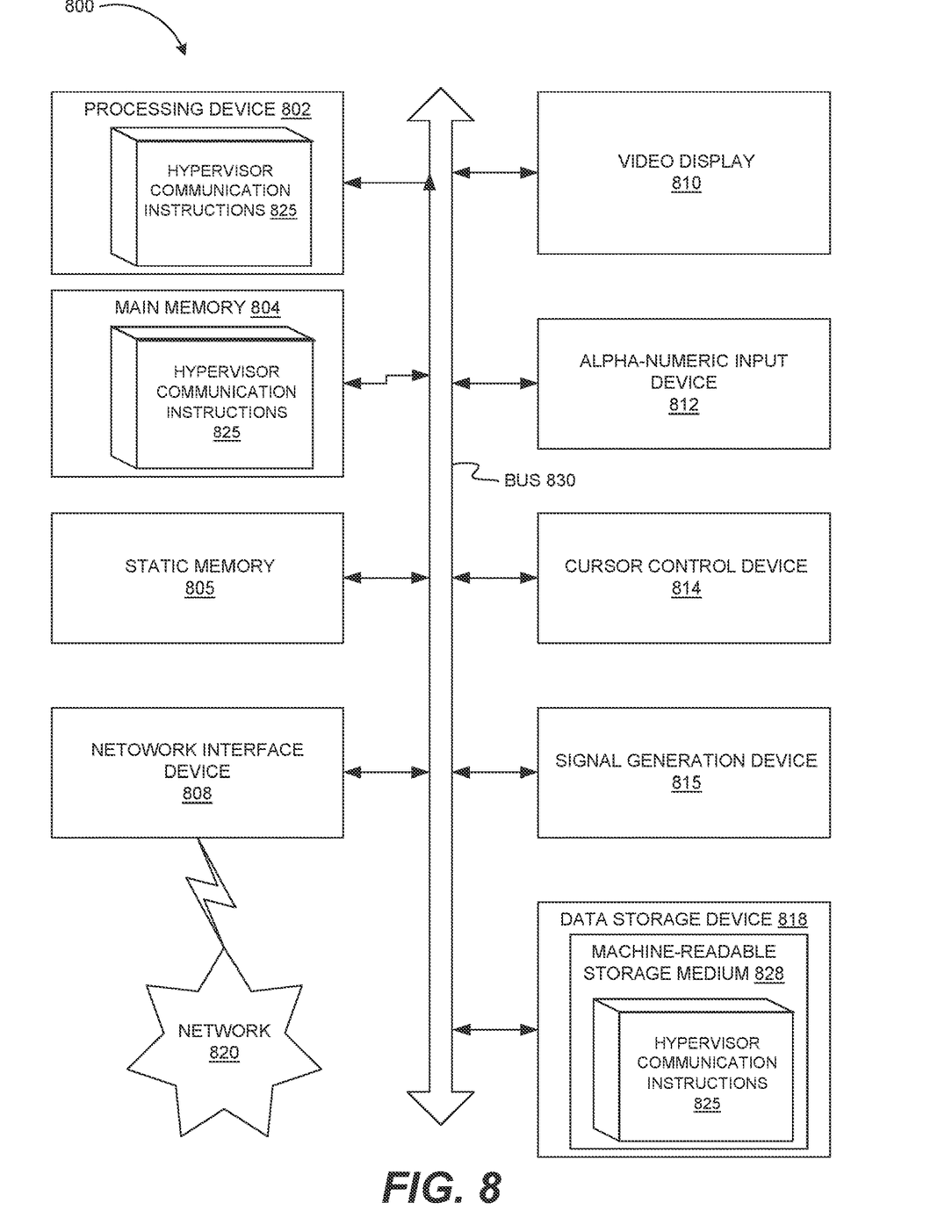
FIG. 8 is a block diagram of an example computing device that may perform one or more of the operations described herein, in accordance with some embodiments of the present disclosure.

FIG. 8 is a block diagram of an example computing device 800 that may perform one or more of the operations described herein, in accordance with some embodiments. For example, computing device 800 may transmit, to a guest operating system (OS) of a virtual machine (VM), an indication that a peripheral component interconnect (PCI) device connected to the VM has been disconnected such that the PCI device appears disconnected to a PCI port driver of the guest OS and simultaneously communicates with a device driver of the guest OS. In this way, while the PCI port driver (and as a result, the guest OS) may assume that the PCI device has been removed, the device driver may not crash as it may still communicate with the PCI device. Because the guest OS assumes the PCI device has been disconnected from the VM, it may wish for the device driver to release resources allocated to the PCI device and thus computing device 800 may transmit a device removal request to the device driver. The removal request may be transmitted to the device driver without the delay associated with the "push button" approach to device removal since the guest OS already believes the PCI device has been disconnected from the VM. The computing device may perform a graceful removal of the device driver and disconnect the PCI device from the VM.

Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of hypervisor communication instructions 825, e.g., instructions for carrying out the operations described herein to enable communication between a VM and a hypervisor, in accordance with one or more aspects of the present disclosure. Random data validation instructions 825 may also reside, completely or at least partially, within main memory 804 and/or within processing device 802 during execution thereof by computing device 800, main memory 804 and processing device 802 also constituting computer-readable media. The random data validation instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving, by a virtual machine (VM) and from a hypervisor, data scrambled according to a decryption routine that is known to both the VM and the hypervisor;
    looking up, by the VM and based on the data scrambled according to the decryption routine, plaintext data in a translation table in guest memory of the VM, wherein the translation table is generated by sending a pattern of bits from the hypervisor to the VM, wherein the pattern of bits is known to the VM and the hypervisor; and
    performing, by the VM, a function based on the plaintext data.

2. The method of claim 1, wherein the translation table is a VM-to-hypervisor translation table generated during a setup routine responsive to instantiation of the VM.

3. The method of claim 1, comprising:
    encrypting, by the VM, unencrypted data using an encryption key to generate encrypted data;
    sending the encrypted data from the VM to the hypervisor by storing, by the VM, the encrypted data to an encrypted memory page of the VM designated by the VM for communication with the hypervisor; and
    looking up, by the hypervisor, the encrypted data in a hypervisor-to-VM translation table to obtain the unencrypted data without using the encryption key.

4. The method of claim 3, wherein the hypervisor-to-VM translation table is generated during a setup routine by sending a first pattern of bits from the VM to the hypervisor, wherein the first pattern of bits is known to the VM and the hypervisor.

5. The method of claim 3, wherein encrypting the unencrypted data comprises adding padding to the unencrypted data to form a chunk of unencrypted data, and encrypting the chunk of unencrypted data to generate the encrypted data.

6. The method of claim 1, wherein receiving the data scrambled according to the decryption routine comprises receiving the data scrambled according to the decryption routine by a driver executing on the VM from a virtual device executing on the hypervisor.

7. A system comprising:
a memory; and
a processing device operatively coupled to the memory, the processing device to:
receive, by a virtual machine (VM) and from a hypervisor, data scrambled according to a decryption routine that is known to both the VM and the hypervisor;
look up, by the VM and based on the data scrambled according to the decryption routine, plaintext data in a translation table in guest memory of the VM; and
perform, by the VM, a function based on the plaintext data, wherein the translation table is a VM-to-hypervisor translation table generated by the processing device during a setup routine responsive to instantiation of the VM, wherein the processing device is further to send a pattern of bits from the hypervisor to the VM to enable the VM to generate the VM-to-hypervisor translation table during the setup routine, wherein the pattern of bits is known to the VM and the hypervisor.

8. The system of claim 7, the processing device further to:
encrypt, by the VM, unencrypted data using an encryption key to generate encrypted data;
send the encrypted data from the VM to the hypervisor by storing, by the VM, the encrypted data to an encrypted memory page of the VM designated by the VM for communication with the hypervisor; and
look up, by the hypervisor, the encrypted data in a hypervisor-to-VM translation table to obtain the unencrypted data without using the encryption key.

9. The system of claim 8, wherein the processing device is further to:
send a first pattern of bits from the VM to the hypervisor to enable the hypervisor to generate the hypervisor-to-VM translation table during the setup routine, wherein the first pattern of bits is known to the VM and the hypervisor.

10. The system of claim 8, wherein to encrypt the unencrypted data, the processing device is to add padding to the unencrypted data to form a chunk of unencrypted data, and encrypt the chunk of unencrypted data to generate the encrypted data.

11. The system of claim 7, wherein to receive the data scrambled according to the decryption routine, the processing device is to receive the data scrambled by the decryption routine by a driver executing on the VM from a virtual device executed on the hypervisor.

12. A non-transitory computer readable medium, having instructions stored thereon that, when executed by a processing device, cause the processing device to:
receive, by a virtual machine (VM) and from a hypervisor, data scrambled according to a decryption routine that is known to both the VM and the hypervisor look up, by the VM and based on the data scrambled according to the decryption routine, plaintext data in a translation table in guest memory of the VM; and
perform, by the VM, a function based on the plaintext data, wherein the translation table is a VM-to-hypervisor translation table generated by the processing device during a setup routine responsive to instantiation of the VM, wherein the processing device is further to: send a pattern of bits from the hypervisor to the VM to enable the VM to generate the VM-to-hypervisor translation table, wherein a pre-specified pattern of bits is known to the VM and the hypervisor.

13. The non-transitory computer readable medium of claim 12, the processing device further to:
encrypt, by the VM, unencrypted data using an encryption key to generate encrypted data;
send the encrypted data from the VM to the hypervisor by storing, by the VM, the encrypted data to an encrypted memory page of the VM designated by the VM for communication with the hypervisor; and
look up, by the hypervisor, the encrypted data in a hypervisor-to-VM translation table to obtain the unencrypted data without using the encryption key.

14. The non-transitory computer readable medium of claim 13, wherein the hypervisor-to-VM translation table is generated by the processing device during the setup routine by sending a first pattern of bits from the VM to the hypervisor, wherein the first pattern of bits is known to the VM and the hypervisor.

15. The non-transitory computer readable medium of claim 13, wherein to encrypt the unencrypted data, the processing device is to add padding to the unencrypted data to form a chunk of unencrypted data, and encrypt the chunk of unencrypted data to generate the encrypted data.

* * * * *